US011178279B1

(12) United States Patent
Ramu et al.

(10) Patent No.: US 11,178,279 B1
(45) Date of Patent: Nov. 16, 2021

(54) DEVICE, SYSTEM AND METHOD FOR SCANNING COMMUNICATION SYSTEMS OF DIFFERENT TYPES

(71) Applicant: MOTOROLA SOLUTIONS, INC., Chicago, IL (US)

(72) Inventors: Shivakumar Bangalore Ramu, Chicago, IL (US); David R. Mills, Chicago, IL (US); Mohd Syazani Abdul Aziz, Chicago, IL (US); Dajun Chen, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/891,346

(22) Filed: Jun. 3, 2020

(51) Int. Cl.
*H04W 76/45* (2018.01)
*H04M 3/436* (2006.01)
(Continued)

(52) U.S. Cl.
CPC ........... *H04M 3/436* (2013.01); *H04M 7/006* (2013.01); *H04W 48/16* (2013.01); *H04W 76/45* (2018.02); *H04W 84/08* (2013.01)

(58) Field of Classification Search
CPC ....... H04W 40/00; H04W 48/08; H04W 4/10; H04W 48/16; H04W 52/00; H04W 52/0219; H04W 52/045; H04W 88/04; H04W 88/06; H04W 84/08; H04W 8/186; H04W 76/45; H03J 1/0091; Y02D 30/70; Y02D 70/142; Y02D 70/22; H04L 61/106; H04L 61/6077; H04M 3/436; H04M 7/006
See application file for complete search history.

(56) References Cited

U.S. PATENT DOCUMENTS 8,682,317 B2   3/2014  Pinder
9,584,987 B1 * 2/2017  Bar-On ................... H04W 4/08
(Continued)

FOREIGN PATENT DOCUMENTS

EP        2612529        3/2016

OTHER PUBLICATIONS

"Public Safety Land Mobile Radio (LMR) Interoperability with LTE Mission Critical Push to Talk", by National Public Safety Telecommunications Council (NPSTC), Final Report, Jan. 8, 2018, 118 pages.

*Primary Examiner* — Jean A Gelin
(74) *Attorney, Agent, or Firm* — Perry + Currier, Inc.

(57) ABSTRACT

A device, method and system for scanning communication systems of different types is provided. A mobile device comprises: first and second transceivers to communicate first and second communication systems of different types; a memory storing first and second scan lists for scanning first and second channels on the first and second communication systems; and a controller configured to: communicate, using the first transceiver, an indication of the first and second scan lists to a gateway device configured as a proxy for the mobile device to communicate with the first communication systems; receive, using the first transceiver, from the gateway device, a reply indicating that the gateway device is capable of scanning the first communication systems using the first scan list, but is not capable of scanning the second communication systems; and control the second transceiver to scan the one or more second communication systems using the second scan list.

20 Claims, 4 Drawing Sheets

(51) Int. Cl.
*H04M 7/00* (2006.01)
*H04W 84/08* (2009.01)
*H04W 48/16* (2009.01)

(56) References Cited

U.S. PATENT DOCUMENTS

| | | | |
|---|---|---|---|
| 10,070,452 B2 | 9/2018 | Fei et al. | |
| 2009/0285165 A1* | 11/2009 | Berglund | H04W 72/082 |
| | | | 370/329 |
| 2010/0099397 A1* | 4/2010 | Belmonte | H04W 48/16 |
| | | | 455/422.1 |
| 2012/0039284 A1* | 2/2012 | Barbieri | H04W 48/10 |
| | | | 370/329 |
| 2015/0264640 A1* | 9/2015 | Feng | H04W 8/183 |
| | | | 455/558 |
| 2016/0081050 A1* | 3/2016 | Lee | H04W 48/16 |
| | | | 370/252 |
| 2016/0095051 A1* | 3/2016 | Sridhar | G01S 5/02 |
| | | | 370/252 |
| 2016/0353360 A1* | 12/2016 | Lee | H04W 72/085 |
| 2017/0034672 A1* | 2/2017 | Pai | H04W 4/08 |
| 2017/0142646 A1 | 5/2017 | McAndrew et al. | |
| 2017/0353859 A1* | 12/2017 | Idnani | H04W 12/08 |
| 2019/0380008 A1* | 12/2019 | Yang | H04W 4/02 |

\* cited by examiner

DEVICE, SYSTEM AND METHOD FOR SCANNING COMMUNICATION SYSTEMS OF DIFFERENT TYPES

BACKGROUND OF THE INVENTION

Mobile devices, for example used by first responders, generally scan communication systems for calls on channels, for example to communicate on talkgroups. However, when there are different communications systems to scan, scanning may be challenging.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
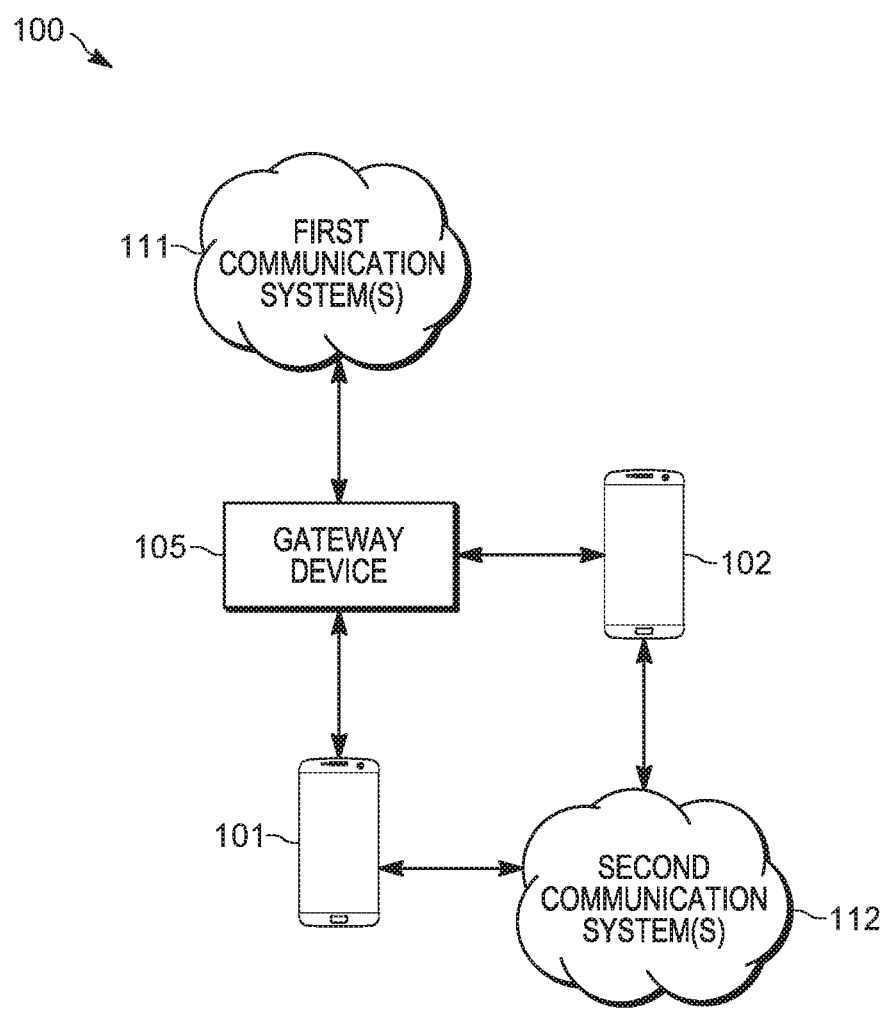
FIG. 1 is a system for scanning communication systems of different types, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Mobile devices, for example used by first responders, generally scan communication systems for calls on channels, for example to communicate on talkgroups. However, when there are different communications systems to scan, scanning may be challenging. For example, scanning on communication systems of different types may be time consuming and/or may lead to delays in scanning. Furthermore, while scanning one communication system, the mobile device may miss a call on the other communication system, or vice versa.

Hence, provided herein a system that includes a gateway device that acts as a proxy for mobile devices on first communication systems of a first type, such as broadband communication systems. A mobile device may transmit a scan list to the gateway device which scans the first communication systems for calls as a proxy for the mobile device; hence the scanning functionality for the first communication systems is "outsourced" to the gateway device, freeing up resources at the mobile device to scan second communication systems of a second type, different from the first type, such as Land-Mobile Radio communication systems. Furthermore, calls from the first communication systems, via the gateway, may be given priority over calls and/or scanning of the second communication systems such that, when a call is received at the mobile device, from the first communication systems (e.g. via the gateway), the call is answered, interrupting any existing calls on the second communication systems and/or scanning on the second communication systems.

An aspect of the present specification provides a method comprising: communicating, via a controller of a mobile device, using a first transceiver configured to communicate with one or more first communication systems, an indication of a first scan list and a second scan list to a gateway device, the gateway device configured as a proxy for the mobile device to communicate with the one or more first communication systems, the first scan list for scanning for first channels on the one or more first communication systems of a first type, the second scan list for scanning for second channels on one or more second communication systems of a second type different from the first type; receiving, via the controller, using the first transceiver, from the gateway device, a reply indicating that the gateway device is capable of scanning the one or more first communication systems using the first scan list, but is not capable of scanning the one or more second communication systems using the second scan list; and in response to receiving the reply, controlling, via the controller, a second transceiver configured to communicate with the one or more second communication systems, to scan the one or more second communication systems using the second scan list.

Another aspect of the present specification provides a mobile device comprising: a first transceiver configured to communicate with one or more first communication systems of a first type; a second transceiver configured to communicate with the one or more second communication systems of a second type different from the first type; a memory storing: a first scan list for scanning for first channels on the one or more first communication systems; and a second scan list for scanning for second channels on the one or more second communication systems; and a controller configured to: communicate, using the first transceiver, an indication of the first scan list and the second scan list to a gateway device, the gateway device configured as a proxy for the mobile device to communicate with the one or more first communication systems; receive, using the first transceiver, from the gateway device, a reply indicating that the gateway device is capable of scanning the one or more first communication systems using the first scan list, but is not capable of scanning the one or more second communication systems using the second scan list; and in response to receiving the reply, control the second transceiver to scan the one or more second communication systems using the second scan list.

Attention is directed to FIG. 1, which depicts an example system 100 for scanning communication systems of different types. The system 100 comprises a first mobile device 101, and at least one second mobile device 102, in communication with a gateway device 105. While not depicted, the mobile devices 101, 102 are understood to be operated by respective users including, but not limited to, first responders (e.g. police officers, fire fighters, emergency medical technicians, and the like). However the mobile devices 101, 102 may be operated by any suitable users including, but not limited to, employees of private entities, such as businesses and the like.

The system 100 further comprises one or more first communication systems 111 and one or more second communication systems 112 that are utilized by the mobile devices 101, 102 to communicate using channels via suitable communication links. Indeed, the various devices and/or components of the system 100 are in communication via any suitable number of communication links, depicted as a double-ended arrow between devices and/or components of the system 100, and the communication links may comprise any suitable number of wired and/or wireless communication links, any suitable number of wired and/or wired communication networks, and the like.

The one or more first communication systems 111 and the one or more second communication systems 112 are interchangeably referred to hereafter, collectively, as the communication systems 111, 112. Similarly, the one or more first communication systems 111 are interchangeably referred to hereafter, collectively, as the first communication systems 111, and, generically, as a first communication system 111. Similarly, the one or more second communication systems 112 are interchangeably referred to hereafter, collectively, as the second communication systems 112, and, generically, as a second communication system 112.

While only two mobile devices 101, 102 are depicted, the system 100 may include more than two mobile devices 101, 102. Hence, while functionality of the system 100 is generally described herein with reference to calls between the mobile devices 101, 102, and in particular calls from the mobile device 102 to the mobile device 101, other mobile devices may make calls to the mobile device 101 (and/or the mobile device 102), which may interrupt a current call between the mobile devices 101, 102, described in more detail below.

Similarly, while only two communication systems 111, 112 are depicted, the system 100 may include more than two communication systems 111, 112, presuming there are at least two communication systems 111, 112 of different types. Hence, for example, the one or more first communication systems 111 and the one or more second communication systems 112 are of different types.

In some examples, the one or more first communication systems 111 may be of a first type such as one or more broadband communication systems (e.g. the Internet, a Wi-Fi network, for example operating in accordance with an IEEE 802.11 standard (e.g., 802.11a, 802.11b, 802.11g), a cell phone network, an LTE (Long-Term Evolution) network and/or other types of GSM (Global System for Mobile communications) and/or 3GPP (3rd Generation Partnership Project) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and the like).

In general, the one or more second communication systems 112 is of a second type, different from the first type, such as one or more land-mobile radio (LMR) communication systems (e.g. a digital mobile radio (DMR) network, a Project 25 (P25) network, a terrestrial trunked radio (TETRA) network, and the like).

However, the communication systems 111, 112 may be any suitable type of communications systems (of different types) that the mobile devices 101, 102 may use to communicate.

Furthermore, while the communication systems 111, 112 are depicted as clouds throughout the present specification, it is understood that the communication systems 111, 112 include any suitable hardware and/or communication infrastructure for providing channels over which the mobile devices 101, 102, (and/or the gateway device 105) may communicate including, but not limited to, antennas, base stations, eNode-B devices, backhauls, and the like.

Furthermore, in some examples, the communication systems 111, 112 may be configured according to different types of security protocols. In a particular example, the one or more first communication systems 111 of the first type may require a security handshake and/or an authentication request/response before a device, such as the mobile devices 101, 102, may use the one or more first communication systems 111 to communicate; in the particular example, the one or more second communication systems 112 of the second type may not require a respective security handshake, and the like. While not depicted, the mobile devices 101, 102 may have been preconfigured to with credentials and/or encrypted credentials and/or access keys, and the like, for communicating on the one or more first communication systems 111 (e.g. when a security handshake is required).

In some examples, one set of the communication systems 111, 112 may be preferred for communications between the mobile devices 101, 102, for example due to coverage and/or bandwidth and/or stability of the communication systems 111, 112. For example, when the first communication systems 111 comprise broadband communication systems, and the second communication systems 112 comprise LMR communication systems, the broadband communication systems may be preferred to due coverage and/or bandwidth and/or stability of broadband communication systems over LMR systems. Such a preference may be provided in the system 100 in the form of priority data of scan lists at the mobile devices 101, 102, as described in more detail below.

In general, the communication systems 111, 112 may be utilized by the mobile devices 101, 102 to communicate via channels, and/or communication channels, including, but not limited to, talkgroups. Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP (Voice-over-internet-protocol) communication path, a push-to-talk channel, and the like. Indeed, groups of channels may be logically organized into talkgroups, and/or dynamically allocated into talkgroups, though channels in a talkgroup may be dynamic as the traffic (e.g. communications) in a talkgroup may increase or decrease, and channels assigned to the talkgroup may be adjusted accordingly. Hence, calls herein may include, but are not limited to, push-to-talk calls, VOIP calls, cell phone calls, and the like.

Furthermore, the communication systems 111, 112 may further include arrangements of channels and/or talkgroups in wide area communication networks (WACNs) and/or subgroups thereof (which may also be colloquially referred to as systems); for examples, channels and/or talkgroups may be broadly grouped according to a plurality of wide area communication networks, and further grouped, within a wide area communication network, by systems. However, the channels and/or talkgroups may be arranged and/or grouped in any suitable manner.

In particular, however, in the system 100, the mobile devices 101, 102 communicate with the first communication systems 111 via the gateway device 105, which may act as a proxy for the mobile devices 101, 102. Functionality of the gateway device 105 may include, but is not limited to, scanning channels of the first communication systems 111 (e.g. for calls, for example on talkgroups, and the like) on behalf of the mobile devices 101, 102, mediating calls between the mobile devices 101, 102 via the first communication systems 111 (e.g. calls between the mobile devices 101, 102 on the first communication systems 111 are routed to the mobile devices 101, 102 via the gateway device 105), and the like. Functionality of the gateway device 105 is described in more detail below, however it is understood that the gateway device 105 may include, but is not limited to, one or more servers, and/or communication servers and/or cloud computing devices, and the like.

Hereafter functionality of the mobile device 101 is described in detail. While functionality of the mobile device 102 is not described in detail, it is understood that the functionality of the mobile device 102 may be the same as, and/or similar to the functionality of the mobile device 101 described herein.

In particular, the mobile device 101 generally maintains scan lists for the communication systems 111, 112 which may comprise lists of channels and/or talkgroups, as well as associated wide area communication networks, groups and/or systems, as well as associated identifiers of the mobile device 101 on the various channels and/or talkgroups and/or wide area communication networks, and/or groups and/or systems. For example, an item in a scan list may include, but is not limited to: an identifier of a communication system (e.g. an identifiers of one of the communication systems 111, 112) used by an associated channel and/or talkgroup, an identifier of the channel and/or talkgroup to be scanned in the communication system, an identifier of an associated wide area communication network of the channel and/or talkgroup, an identifier of an associated group and/or system of the channel and/or talkgroup, and an identifier of the mobile device 101. The identifier of the mobile device 101 may be the same or different for the communication systems 111, 112 and/or various wide area communication networks and/or various groups and/or systems.

In general, the mobile device 101 may initially store a preconfigured scan list that includes the channels to be scanned on the communication systems 111, 112 (e.g. both the communication systems 111, 112 and/or all the communication systems 111, 112); for example, the preconfigured scan list may include a first scan list of first channels, and the like, on the first communication systems 111 and second scan list of second channels, and the like, on the second communication systems 112. For example, the mobile device 101 may be configured with the preconfigured scan list (which is also referred to herein as a preconfigured combined scan list) at the start of a shift of a first responder to which the mobile device 101 is assigned, and/or the mobile device 101 may be configured with the preconfigured scan list in any suitable manner. The mobile device 101 may communicate the preconfigured scan list (e.g. including the first scan list and the second scan list) to the gateway device 105 which responds by indicating which channels in the preconfigured scan list are supported by the gateway device 105 for scanning (e.g. the first scan list). The mobile device 101 may split the preconfigured scan list into the first list and the second list, and thereafter rely on the gateway device 105 to scan the first communication systems 111 using the first scan list, and the mobile device 101 may scan the second communication systems 112 using the second scan list.

As used herein, it is understood that the terms "scan" and/or "scanning" for channels includes a device (such as the mobile device 101, the gateway device 105, and the like), communicating with hardware and/or communication infrastructure of a communication system to communicate over given channels (e.g. sequentially) to determine whether a call is being received on a channel.

Figure 2:
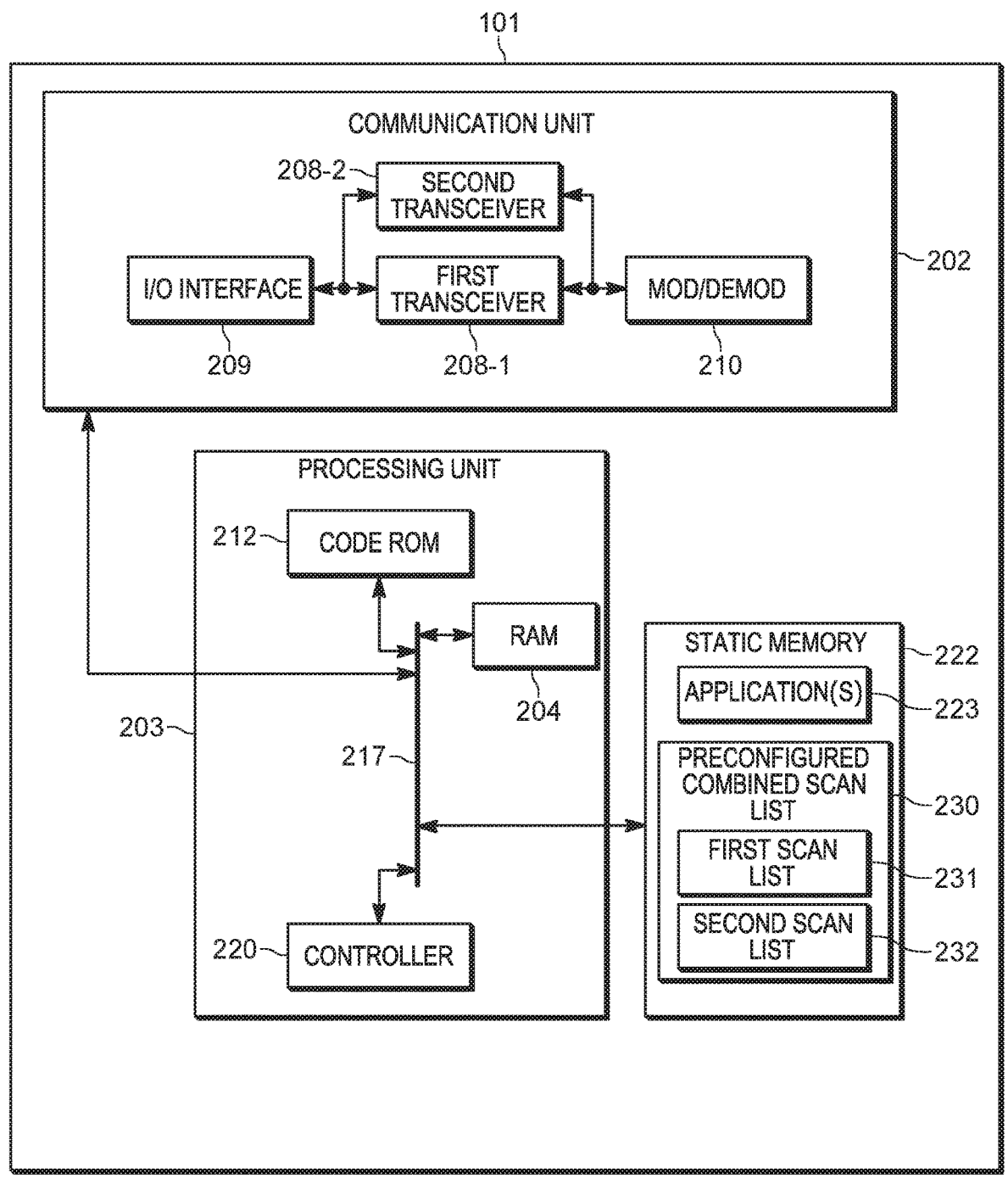
FIG. 2 is a device diagram showing a device structure of a mobile device for scanning communication systems of different types, in accordance with some examples.

Attention is next directed to FIG. 2 which depicts a schematic block diagram of an example of the mobile device 101. In general, the mobile device 101 may comprise any suitable mobile device and/or portable device and/or communication device including, but not limited to a cell phone, smart phone, a land-mobile radio, a vehicle communication device, a laptop computer, and the like. In some examples, the mobile device 101 may comprise a mobile device adapted for use by first responders, and the like, and/or the mobile device 101 may comprise a mobile device adapted for use by employees of private entities and the like.

As depicted, the mobile device 101 comprises: at least one communication unit 202, a processing unit 203, a Random-Access Memory (RAM) 204, a first wireless transceiver 208-1 and a second wireless transceiver 208-2, one or more wired and/or wireless input/output (I/O) interfaces 209, a modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the mobile device 101 may include, but is not limited to, one or more input devices, one or more display screens, one or more microphones and one or more speakers, such that a user may interact with the mobile device 101 to communicate on channels and/or talkgroups.

As shown in FIG. 2, the mobile device 101 includes the communication units 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 which are configurable to communicate with the communication systems 111, 112. For example, the communication unit 202 may include the first transceiver 208-1 configured to communicate with the first communication systems 111 (e.g. and the gateway device 105), and the second transceiver 208-2 configured to communicate with the second communication systems 112. Hereafter the wireless transceivers 208-1, 208-2 are interchangeably referred to hereafter, collectively, as the wireless transceivers 208 and, generically, as a wireless transceiver 208. Furthermore, while each transceiver 208 is depicted as a single transceiver, each transceiver 208 may comprise one or more respective transceiver configured to communicate with communication systems of a respective type.

For example, the first transceiver 208-1 may be adapted for communication with one or more broadband communication systems including, but not limited to, one or more of the Internet, a Wi-Fi network, for example operating in accordance with an IEEE 802.11 standard (e.g., 802.11a, 802.11b, 802.11g), an LTE (Long-Term Evolution) network and/or other types of GSM and/or 3GPP networks, a 5G network, WiMAX network, and/or another similar type of wireless communication system and/or wireless network, and the like. Hence, the first transceiver 208-1 may include, but is not limited to, one or more of a cell phone transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a communication system of a first type.

Similarly, the second transceiver 208-2 may be adapted for communication with one or more LMR communication systems, including, but not limited to, a DMR network, a P25 network, a TETRA network. Hence, the transceiver 208-2 may include, but is not limited to, one or more of an LMR transceiver, a DMR transceiver, P25 transceiver, a TETRA transceiver, and/or another similar type of wireless transceiver configurable to communicate via a communication system of a second type, different from the first type of the communication system with which the first transceiver 208-1 is adapted to communicate.

While the transceivers 208 are depicted as being components of a same communication unit 202, and sharing resources with the one or more wired and/or wireless input/output (I/O) interfaces 209 and the modulator/demodulator 210, in other examples, the mobile device 101 may comprise two or more communication unit 202, and the transceivers 208 may be components of respective communication units 202, with respective input/output (I/O) interfaces 209 and respective modulator/demodulators 210 provided for the communication units 202.

Furthermore, the mobile device 101 may include transceivers for communicating on other types of networks, including, but not limited to, a Bluetooth™ network, a near field communication (NFC) network, and the like.

The communication unit 202 may optionally include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The controller 220 may include ports (e.g. hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the mobile device 101 is not a generic controller and/or a generic device, but a device specifically configured to implement functionality for scanning communication systems of different types. For example, in some examples, the mobile device 101 and/or the controller 220 specifically comprises a computer executable engine configured to implement functionality for scanning communication systems of different types.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the mobile device 101 as described herein are maintained, persistently, at the memory 222 and used by the controller 220 which makes appropriate utilization of volatile storage during the execution of such programming instructions.

Figure 3:
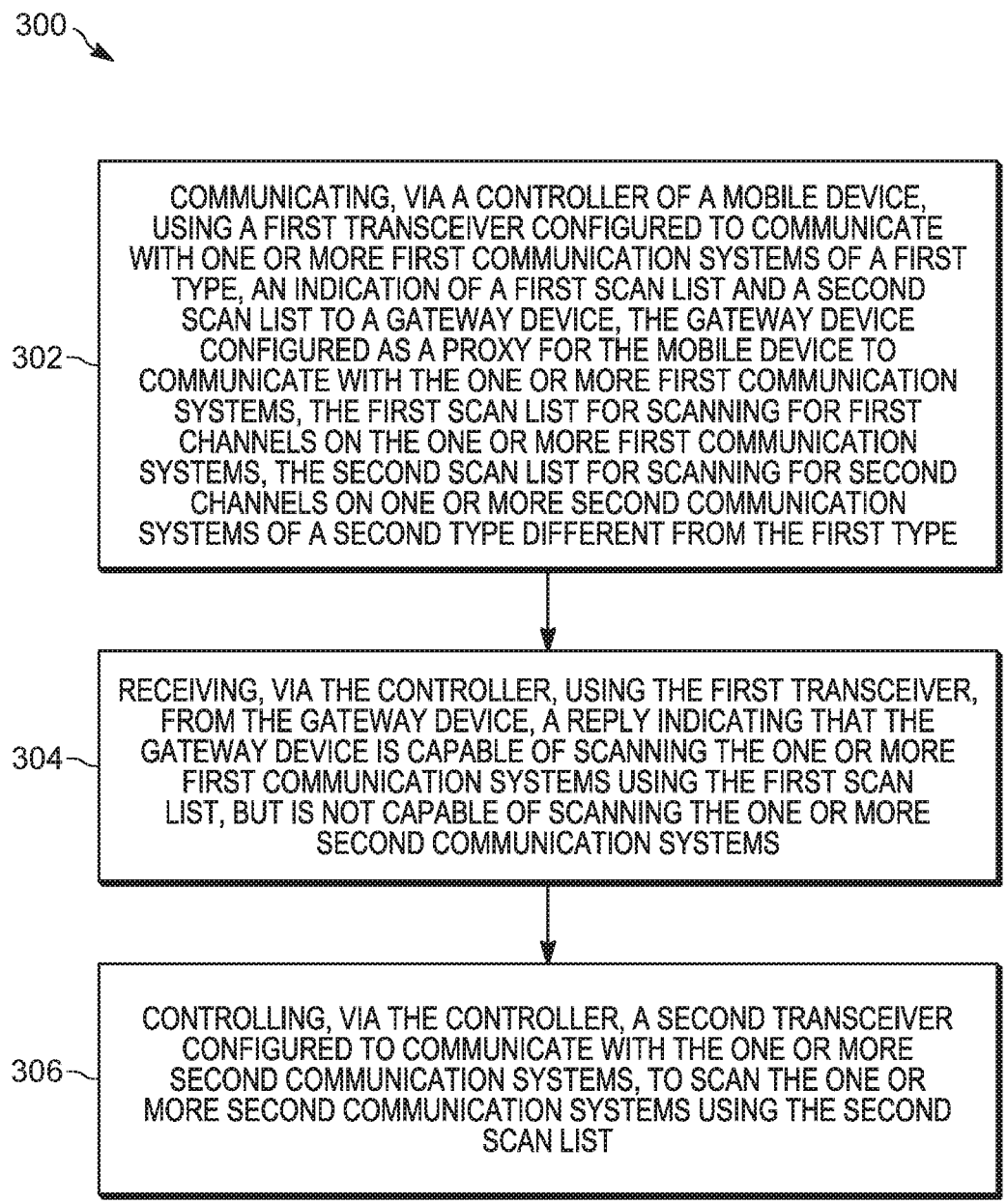
FIG. 3 is a flowchart of a method for scanning communication systems of different types, in accordance with some examples.

In particular, the memory 222 stores instructions corresponding to the at least one application 223 that, when executed by the controller 220, enables the controller 220 to implement functionality for scanning communication systems of different types including, but not limited to, the blocks of the method set forth in FIG. 3.

Furthermore, as depicted, the memory 222 stores a preconfigured combined scan list 230 that includes a first scan list 231 for scanning for first channels on the one or more first communication systems 111, a second scan list 232 for scanning for second channels on one or more second communication systems 112, as described above. In a particular example, the first channels (of the first scan list 231) may comprise first talkgroups that use the one or more first communication systems 111 for communications, and the second channels (of the second scan list 232) may comprise a second talkgroups that use the one or more second communication systems 112 for communications.

As described above, the scan lists 231, 232 may comprise respective lists of channels and/or talkgroups to be scanned including, but not limited to respective identifiers of communication systems used by an associated channel and/or talkgroup, an identifier of the channel and/or talkgroup to be scanned in the communication system, associated wide area communication networks associated groups and/or systems and the mobile device 101.

Furthermore, as describe in more detail below, the scan lists 231, 232 may be associated with respective priorities. For example, in a particular example, the first scan list 231 may have priority over the second scan list 232 such that calls received on channels of the first scan list 231 have priority over calls on channels of the second scan list 232. In some examples, respective channels of the scan lists 231, 232 may be associated with respective priorities such that channels of the first scan list 231 have associated priorities, and channels of the second scan list 232 have respective associated priorities. However, priorities of the scan lists 231, 232 and/or channels thereof, may be indicated in any particular manner. Individual channel priorities may be indicated in the scan lists 231, 232 themselves (e.g. as associated priority data) and/or a priority of the first scan list 231 relative to the second scan list 232 may be stored at the application 223 and/or the memory 222.

In illustrated examples, when the controller 220 executes the one or more applications 223, the controller 220 is enabled to: communicate using a first transceiver configured to communicate with one or more first communication systems of a first type, an indication of a first scan list and a second scan list to a gateway device, the gateway device configured as a proxy for the mobile device to communicate with the one or more first communication systems, the first scan list for scanning for first channels on the one or more first communication systems, the second scan list for scanning for second channels on one or more second communication systems of a second type different from the first type; receive, using the first transceiver, from the gateway device, a reply indicating that the gateway device is capable of scanning the one or more first communication systems using the first scan list, but is not capable of scanning the one or more second communication systems; and in response to receiving the reply, control a second transceiver configured to communicate with the one or more second communication systems, to scan the one or more second communication systems using the second scan list.

While details of the mobile device 102 and the gateway device 105 are not depicted, such components of the system 100 are understood to have structures to the mobile device 101 as depicted in FIG. 2, but adapted for their respective functionality. For example, the gateway device 105 is generally configured to act as a proxy for the mobile devices 101, 102; hence, the gateway device 105 generally comprises a respective controller and respective transceiver (e.g. similar to the first transceiver 208-1) for communicating with the first communication systems 111.

Attention is now directed to FIG. 3, which depicts a flowchart representative of a method 300 for scanning communication systems of different types. The operations of the method 300 of FIG. 3 correspond to machine readable instructions that are executed by the mobile device 101, and specifically the controller 220 of the mobile device 101. In the illustrated example, the instructions represented by the blocks of FIG. 3 are stored at the memory 222 for example, as the application 223. The method 300 of FIG. 3 is one way in which the controller 220 and/or the mobile device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the mobile device 101 communicates and/or provides, using the first transceiver 208-1 (e.g. configured to communicate with the one or more first communication systems 111 of a first type), an indication of the first scan list 231 and the second scan list 232 to the gateway device 105, the gateway device 105 configured as a proxy for the mobile device 101 to communicate with the one or more first communication systems 111, the first scan list 231 for scanning for first channels on the one or more first communication systems 111, the second scan list 232 for scanning for second channels on one or more second communication systems 112 of a second type different from the first type.

In particular, as described above, the first scan list 231 and the second scan list 232 may be provided as the preconfigured combined scan list 230, for example without the mobile device 101 explicitly being initially configured to scan the communications systems 111, 112 with respective scan lists 231, 232. Hence, in some examples, at the block 302, the controller 220 and/or the mobile device 101 may communicate and/or provide the indication of the first scan list 231 and the second scan list 232 as the preconfigured combined scan list 230. Put another way, at the block 302, the indication of the first scan list 231 and the second scan list 232 may be communicated to the gateway device 105, by the controller 220 and/or the mobile device 101, as the preconfigured combined scan list 230. For example, the block 302, the controller 220 and/or the mobile device 101 may wirelessly transmit preconfigured combined scan list 230 to the gateway device 105. However, the indication of the first scan list 231 and the second scan list 232 may be provided to the gateway device 105 in any suitable format, for example as a subset of identifiers of the first scan list 231, the second scan list 232 and/or the preconfigured combined scan list 230.

It is further understood that the controller 220 and/or the mobile device 101 has been preconfigured with a network identifier and/or address of the gateway device 105 and the block 302 may include the controller 220 and/or the mobile device 101 registering with the gateway device 105, and the like, for example via secure connection such as a Transport Layer Security (TLS) connection and/or, and the like.

At a block 304, the controller 220 and/or the mobile device 101 receives, using the first transceiver 208-1, from the gateway device 105, a reply indicating that the gateway device 105 is capable of scanning the one or more first communication systems 111 using the first scan list 231, but is not capable of scanning scan the one or more second communication systems 112 (e.g. using the second scan list 232).

In some examples, the reply received by the gateway device 105 may comprise identifiers of the one or more first communication systems 111 and/or identifiers of the channels of the first scan list 231, and the reply may omit respective identifiers of the one or more second communication systems 112 and the reply may further omit identifiers of the channels of the second scan list 232. For example, the gateway device 105 is generally configured to communicate with the first communication systems 111, but not the second communication systems 112, and hence is generally preconfigured with data and/or identifiers of the first communication systems 111 that enables the gateway device 105 to communicate with the first communication systems 111 (e.g. identifiers of one or more of the first communication systems 111, channels on the first communication systems 111, WACNs of the first communication systems 111, systems (e.g. groups of channels) the first communication systems 111, and the like).

For example, when the gateway device 105 receives the indication of the first scan list 231 and the second scan list 232, the gateway device 105 may compare the identifiers of the first scan list 231 and the second scan list 232, received in the indication, with stored identifiers and determine that identifiers of the first scan list 231 match stored identifiers, while identifiers of the second scan list 232 do not match stored identifiers; hence the gateway device 105 may ignore and/or discard identifiers of the second scan list 232, received from the mobile device 101, that do not match identifiers stored at the gateway device 105. Hence, in some examples, the gateway device 105 generates a reply via such a comparison.

Furthermore, the reply may indicate that the gateway device 105 is capable of scanning the one or more first communication systems 111 using the first scan list 231 via an inclusion of data and/or identifiers, and the like, associated with the first scan list 232. Similarly, the reply may indicate that the gateway device 105 is not capable of scanning the one or more second communication systems 112 via an omission of data and/or identifiers, and the like, associated with the second scan list 232.

As mentioned previously, in some examples, the communication systems 111, 112 may be configured according to different types of security protocols. In a particular example, the one or more first communication systems 111 of the first type may require a security handshake before a device, such as the mobile devices 101, 102, may use the one or more first communication systems 111 to communicate; in the particular example, the one or more second communication systems 112 of the second type may not require a respective security handshake. Hence, in some of these examples, the reply received at the block 304 may comprise one or more of the security handshake and an authentication request of the security handshake, for example to authenticate with the one or more first communication systems 111. Such a security handshake and/or authentication request may include data and/or identifiers, and the like, associated with the first scan list 232 and omit respective data and/or identifiers, and the like, associated with the second scan list 232.

In some examples, the controller 220 and/or the mobile device 101, in response to receiving the reply, may split the preconfigured combined scan list 230 into the first scan list 231 and the second scan list 232, and stores, at a memory 222, the first scan list 231 and the second scan list 232, for example, as separate lists. For example, the controller 220 and/or the mobile device 101 may extract, from the preconfigured combined scan list 230, the items of the first scan list 231 identified in the reply received from the gateway device 105 to store as the separate first scan list 231, and similarly extract, from the preconfigured combined scan list 230, the items of the second scan list 232 not identified in the reply received from the gateway device 105 to store as the separate second scan list 232.

It is further understood that the gateway device 105 generally scans the one or more first communication systems 111 using the first scan list 231, which may be derived by the gateway device 105 from the receipt of the scan lists 231, 232 (e.g. as the preconfigured combined scan list 230) and the generation of the reply. However, in other examples, when the controller 220 and/or the mobile device 101, splits the preconfigured combined scan list 230 into the first scan list 231 and the second scan list 232 (and, for example, completes the security handshake), the controller 220 and/or the mobile device 101 may transmit the first scan list 231, and/or a portion thereof, to the gateway device 105 to explicitly instruct the gateway device 105 to scan the one or more first communication systems 111 using the first scan list 231.

At a block 306, the controller 220 and/or the mobile device 101, in response to receiving the reply, controls the second transceiver 208-1 (e.g. configured to communicate with the one or more second communication systems 112), to scan the one or more second communication systems 112 using the second scan list 232.

Hence, the gateway device 105 scans the one or more first communication systems 111 using the first scan list 231, for example for calls on channels and/or talkgroups of the first scan list 231, and the mobile device 101 scans the one or more second communication systems 112 using the second scan list 232, for example for calls on channels and/or talkgroups of the second scan list 232. As such, use of processing resources at the mobile device 101 are reduced, and furthermore, scanning for calls on both communication systems 111, 112 may occur simultaneously.

Furthermore it is understood that the gateway device 105 generally manages calls received for the mobile device 101 on first channels of the first communication systems 111, while the mobile device 101 generally manages calls received for the mobile device 101 on second channels of the second communication systems 112. Indeed, it is further understood that calls received for the mobile device 101 on first channels of the first communication systems 111 (e.g. from the second mobile device 102) occur via the gateway device 105.

However, as described above, the scan lists 231, 232 may be assigned relative priorities, and such priorities may be used by the mobile device 101 to determine how to handle calls when such calls occur on both the communication systems 111, 112. Similarly, when channels of the scan lists 231, 232 have respective associated priorities, priorities for the first channels of the first scan list 231 may be used by the gateway device 105 to determine how to handle calls on channels (e.g. first channels) of the first communication systems 111, while priorities for the second channels of the first scan list 232 may be used by the mobile device 101 to determine how to handle calls on channels (e.g. second channels) of the second communication systems 112.

For example, the first scan list 231 may have priority over the second scan list 232, and the method 300 may comprise: while the controller 220 and/or the mobile device 101 is managing, via the second transceiver 208-2, a call over a second channel (e.g. on the second communication systems 112), receiving, using the controller 220 and/or the mobile device 101, via the first transceiver 208-1, an incoming call from the gateway device 105, the incoming call being on a first channel (e.g. on the first communication systems 111); and interrupting, using the controller 220 and/or the mobile device 101, the call to take the incoming call, due to the first scan list 231 having priority over the second scan list 232. Put another way, the controller 220 and/or the mobile device 101 may interrupt (e.g. drop and/or hang up) an existing and/or current call on a second channel of the second communication systems 112 in favor of taking an incoming call on a first channel of the first communication systems 111, for example as received from the gateway device 105.

In another example, the first scan list 231 may indicate first channels (e.g. of the first communication systems 111) with first associated priorities, and the second scan list 232 may indicate second channels (e.g. of the second communication systems 112) with second associated priorities, and the method 300 may further comprise the controller 220 and/or the mobile device 101: relying on the gateway device 105 to manage first incoming calls on the first channels using the first associated priorities; and managing second incoming calls on the second channels using the second associated priorities.

Hence, for example, when the channels of the scan lists 231, 232 have respective associated priorities, the gateway device 105 manages such priorities for calls received via the first communication systems 111 while the mobile device 101 manages such priorities for calls received via the second communication systems 112. For example, when an incoming call is received at the gateway device 105 via the first communication systems 111, on a first channel of the first communication systems 111, and via the gateway device 105, and there is a current call that the mobile device 101 is conducting on another first channel of the first communication systems 111, via the gateway device 105, the gateway device 105 may determine whether to interrupt the current call (e.g. in favor of the incoming call), or not accept the incoming call. Such an interruption may be based on the associated priorities of the first channels of the calls. Similarly, when an incoming call is received at the mobile device 101 via the second communication systems 111, on a second channel of the second communication systems 111, and there is a current call that the mobile device 101 conducted on another second channel of the second communication systems 111, the mobile device 101 determines whether to interrupt the current call (e.g. in favor of the incoming call), or not accept the incoming call, based on the associated priorities of the second channels.

However, the mobile device 101 generally manages collisions between calls of both the communication systems 111, 112. For example, when the first scan list 231 indicates first channels with first associated priorities, and the second scan list 232 indicates second channels with second associated priorities, and the first scan list 231 has priority over the second scan list 232, the method 300 may further comprise, the controller 220 and/or the mobile device 101: relying on the gateway device 105 to manage first incoming calls on the first channels using the first associated priorities; managing second incoming calls on the second channels using the second associated priorities; and interrupting a second call on a second channel, to take a first call on a first channel (e.g. as received via the gateway device 105), due to the first scan list 231 having priority over the second scan list 232.

Furthermore, when the first scan list 231 has priority over the second scan list 232, the method 300 may comprise the controller 220 and/or the mobile device 101: while conducting and/or participating in a call over a first channel (e.g. of the first communication systems 111 via the gateway device 105), using the first transceiver 208-1, controlling the second transceiver 208-2 to pause and/or stop scanning of the one or more second communication systems 112. For example, as the first scan list 231 has priority over the second scan list 232, calls over the second channels received while a call over a first channel is being conducted will not interrupt the call over the first channel, and hence processing resources and/or bandwidth may be saved by pausing scanning over the by the second transceiver 208-2. When the call over the first channel ends, the controller 220 and/or the mobile device 101 may control the second transceiver 208-2 to resume scanning of the second communication systems 112 using the second scan list 232.

Figure 4:
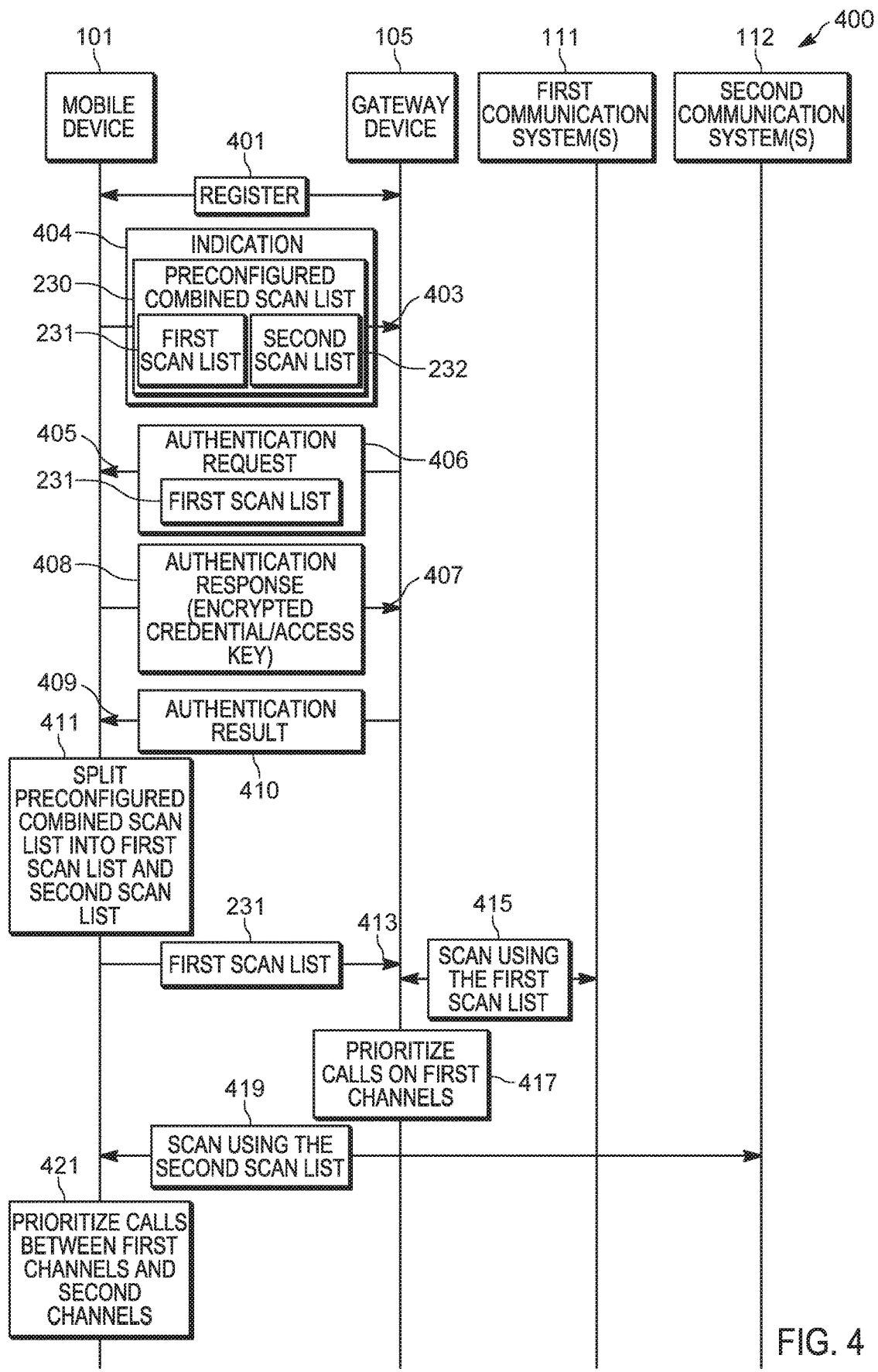
FIG. 4 is a signal diagram showing an example method for scanning communication systems of different types, in accordance with some examples.

Attention is next directed to FIG. 4 which depicts an example signal diagram 400 showing communication between the mobile device 101, the gateway device 105 and the communication systems 111, 112 (e.g. hardware and/or communication infrastructure thereof) while the mobile device 101 is implementing the method 300. While the mobile device 102 is not depicted, it is understood that one or more second mobile devices 102 may also be present and may initiate calls to the mobile device 101 via the communication systems 111, 112 and/or the gateway device 105. Furthermore, the mobile device 102 (and the like), may also implement the method 300 (e.g. while the mobile device 101 is implementing the method 300), and may communicate with the gateway device 105 and the communication systems 111, 112 as depicted in the signal diagram 400.

As depicted in the signal diagram 400, the mobile device 101 may initiate communication with the gateway device 105 via a registration process 401, for example in which the mobile device 101 "tells" the gateway device 105 that the mobile device 101 is operational, and the like. Various exchanges of registration data may occur during the registration process 401.

The mobile device 101 transmits 403 (e.g. after the registration process 401 and/or during the registration process 401, for example at the block 302 of the method 300) an indication 404 of the first scan list 231 and the second scan list 232 to the gateway device 105; for example, as depicted, the mobile device 101 transmits 403 the preconfigured combined scan list 230 to the gateway device 105. However, regardless of format, the indication 404 may generally indicate communication systems 111, 112 and/or WACNs thereof and/or systems (e.g. groups of channels and/or talkgroups) thereof with which the mobile device 101 is requesting to communicate.

The gateway device 105 receives the indication 404 and transmits 405 a reply to the mobile device 101 which receives the reply (e.g. at the block 304 of the method 300). As depicted, the reply transmitted by the gateway device 105 comprises an authentication request 406 as part of a security handshake between the mobile device 101 and the gateway device 105. While note depicted, the security handshake may further include the gateway device 105 mediating the security handshake with the first communication systems 111. As depicted the authentication request 406 comprises the first scan list 231 and/or a portion thereof, for example indicating first communication systems 111 and/or WACNs thereof and/or systems (e.g. groups of channels and/or talkgroups) thereof with which the mobile device 101 is requesting to communicate; indeed, the gateway device 105 ignores and/or omits indications of the second communication systems 112, and may generate the reply in any suitable manner as described above.

As depicted, the mobile device 101 responds to the authentication request 406 by transmitting 407 an authentication response 408 which may include, but is not limited to, one or more encrypted credentials and/or access keys (e.g. cryptographic keys), and the like. For example, the encrypted credentials and/or access keys, and the like, s may be for communicating, in an encrypted manner on the first communication systems 111 and the mobile device 101 is understood to have been preconfigured with such encrypted credentials and/or access keys, and the like.

The gateway device 105 receives the authentication response 408 and may communicate with the first communication systems 111 to verify the encrypted credentials and/or access keys, and/or the gateway device 105 may be configured to verify the encrypted credentials and/or access keys using data stored at the gateway device 105. Regardless, the gateway device 105 may use any suitable process for verifying and/or authenticating the mobile device 101 using data received with the authentication response 408 and, when the verification and/or authentication occurs, the gateway device 105 transmits 409 an authentication result 410 to the mobile device 101. Presuming the verifying and/or authenticating process is successful (as depicted), the authentication result 410 indicates that the mobile device 101 is authenticated; otherwise the authentication result 410 may indicate that the authentication process is not successful and communications from the mobile device 101 to the gateway device 105 may thereafter be refused by the gateway device 105.

It is understood that the authentication request 406, the authentication response 408 and the authentication result 410 may all be components of a security handshake.

Presuming the verifying and/or authenticating process is successful (as depicted), the mobile device 101 may split 411 the preconfigured combined scan list 230 into the first scan list 231 and the second scan list 232 and store the first scan list 231 and the second scan list 232 as separate lists.

As depicted, after the mobile device 101 splits 411 the preconfigured combined scan list 230 into the first scan list 231 and the second scan list 232, the mobile device 101 transmits 413 the first scan list 231 to the gateway device 105, which scans 415 the first channels of the first communication systems 111, as described above, for example by communicating with hardware and/or communication infrastructure of the first communication systems 111. The gateway device 105 further prioritizes 417 calls on the first channels as described above. In particular, as the gateway device 105 does not have access to calls on the second channels the gateway device 105 may prioritize calls of the first channels of the first scan list 231 but cannot prioritize calls of the second channels of the second scan list 232 (e.g.

the gateway device 105 generally monitors channels of the first scan list 231, but does not have access to the channels of the second scan list 232); put another way, the gateway device 105 may prioritize only calls of the first channels of the first scan list 231.

Furthermore, the mobile device 101 scans 419 the second channels of the second communication systems 112, as described above, for example by communicating with hardware and/or communication infrastructure of the second communication systems 112. The mobile device 101 further prioritizes 421 calls between the first channels and the second channels as described above. In particular, as the mobile device 101 receives calls on the first channels and the second channels the mobile device 101 may prioritize between a call of the first channels and calls of the second channels (e.g. with calls on the first channels prioritized by the gateway device 105 such that the mobile device 101 may prioritize between one call on the first channels and calls on the second channels, and the mobile device 101 may prioritize between a plurality of calls on the second channels when there is no current call on the first channel).

As should be apparent from this detailed description above, the operations and functions of computing devices described herein are sufficiently complex as to require their implementation on a computer system, and cannot be performed, as a practical matter, in the human mind. Computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
communicating, via a controller of a mobile device, using a first transceiver configured to communicate with one or more first communication systems, an indication of a first scan list and a second scan list to a gateway device, the gateway device configured as a proxy for the mobile device to communicate with the one or more first communication systems, the first scan list for scanning for first channels on the one or more first communication systems of a first type, the second scan list for scanning for second channels on one or more second communication systems of a second type different from the first type;
receiving, via the controller, using the first transceiver, from the gateway device, a reply indicating that the gateway device is capable of scanning the one or more first communication systems using the first scan list, but is not capable of scanning the one or more second communication systems using the second scan list; and
in response to receiving the reply, controlling, via the controller, a second transceiver configured to communicate with the one or more second communication systems, to scan the one or more second communication systems using the second scan list.

2. The method of claim 1, wherein the first channels comprise first talkgroups that use the one or more first communication systems for communications, and the second channels comprises a second talkgroups that use the one or more second communication systems for communications.

3. The method of claim 1, wherein the first scan list has priority over the second scan list, such that the method further comprises:
while the controller is managing, via the second transceiver, a call over a second channel, receiving, using the controller, via the first transceiver, an incoming call from the gateway device, the incoming call being on a first channel; and
interrupting, using the controller, the call to take the incoming call, due to the first scan list having priority over the second scan list.

4. The method of claim 1, wherein the first scan list indicates the first channels with first associated priorities, and the second scan list indicates the second channels with second associated priorities, such that the method further comprises:
relying, using the controller, on the gateway device to manage first incoming calls on the first channels using the first associated priorities; and
managing, using the controller, second incoming calls on the second channels using the second associated priorities.

5. The method of claim 1, wherein the first scan list indicates the first channels with first associated priorities, and the second scan list indicates the second channels with second associated priorities, and the first scan list has priority over the second scan list, such that the method further comprises:
relying, using the controller, on the gateway device to manage first incoming calls on the first channels using the first associated priorities;
managing, using the controller, second incoming calls on the second channels using the second associated priorities; and
interrupting, using the controller, a second call on a second channel, to take a first call on a first channel, due to the first scan list having priority over the second scan list.

6. The method of claim 1, wherein the one or more first communication systems of the first type require a security handshake and the one or more second communication systems of the second type do not require a respective security handshake, the reply comprising one or more of the security handshake and an authentication request of the security handshake.

7. The method of claim 1, wherein the reply comprises one or more of: a security handshake for communicating with one or more first communication systems; and an authentication request of the security handshake.

8. The method of claim 1, wherein the reply comprises identifiers of the one or more first communication systems, the reply omitting respective identifiers of the one or more second communication systems.

9. The method of claim 1, wherein the one or more first communication systems of the first type comprise one or more broadband communication systems, and the one or more second communication systems of the second type comprise one or more land-mobile radio (LMR) communication systems.

10. The method of claim 1, wherein the indication of the first scan list and the second scan list, communicated to the gateway device, comprises a preconfigured combined scan list, and the method further comprises:
in response to receiving the reply that the gateway device is capable of scanning the one or more first communication systems using the first scan list, but is not capable of scanning scan the one or more second communication systems: splitting the preconfigured combined scan list into the first scan list and the second scan list; and
storing, at a memory of the mobile device, the first scan list and the second scan list.

11. A mobile device comprising:
a first transceiver configured to communicate with one or more first communication systems of a first type;
a second transceiver configured to communicate with the one or more second communication systems of a second type different from the first type;
a memory storing: a first scan list for scanning for first channels on the one or more first communication systems; and a second scan list for scanning for second channels on the one or more second communication systems; and
a controller configured to:
communicate, using the first transceiver, an indication of the first scan list and the second scan list to a gateway device, the gateway device configured as a proxy for the mobile device to communicate with the one or more first communication systems;
receive, using the first transceiver, from the gateway device, a reply indicating that the gateway device is capable of scanning the one or more first communication systems using the first scan list, but is not capable of scanning the one or more second communication systems using the second scan list; and
in response to receiving the reply, control the second transceiver to scan the one or more second communication systems using the second scan list.

12. The device of claim 11, wherein the first channels comprise first talkgroups that use the one or more first communication systems for communications, and the second channels comprises a second talkgroups that use the one or more second communication systems for communications.

13. The device of claim 11, wherein the first scan list has priority over the second scan list, such that the controller is further configured to:
   while the controller is managing, via the second transceiver, a call over a second channel, receive, using the controller, via the first transceiver, an incoming call from the gateway device, the incoming call being on a first channel; and
   interrupt the call to take the incoming call, due to the first scan list having priority over the second scan list.

14. The device of claim 11, wherein the first scan list indicates the first channels with first associated priorities, and the second scan list indicates the second channels with second associated priorities, such that the controller is further configured to:
   rely on the gateway device to manage first incoming calls on the first channels using the first associated priorities; and
   manage second incoming calls on the second channels using the second associated priorities.

15. The device of claim 11, wherein the first scan list indicates the first channels with first associated priorities, and the second scan list indicates the second channels with second associated priorities, and the first scan list has priority over the second scan list, such that the controller is further configured to:
   rely on the gateway device to manage first incoming calls on the first channels using the first associated priorities;
   manage second incoming calls on the second channels using the second associated priorities; and
   interrupt a second call on a second channel, to take a first call on a first channel, due to the first scan list having priority over the second scan list.

16. The device of claim 11, wherein the one or more first communication systems of the first type require a security handshake and the one or more second communication systems of the second type do not require a respective security handshake, the reply comprising one or more of the security handshake and an authentication request of the security handshake.

17. The device of claim 11, wherein the reply comprises one or more of: a security handshake for communicating with one or more first communication systems; and an authentication request of the security handshake.

18. The device of claim 11, wherein the reply comprises identifiers of the one or more first communication systems, the reply omitting respective identifiers of the one or more second communication systems.

19. The device of claim 11, wherein the one or more first communication systems of the first type comprise one or more broadband communication systems, and the one or more second communication systems of the second type comprise one or more land-mobile radio (LMR) communication systems.

20. The device of claim 11, wherein: the first scan list and the second scan list are initially stored at the memory as a preconfigured combined scan list; the indication of the first scan list and the second scan list, communicated to the gateway device, comprises the preconfigured combined scan list; and the controller is further configured to:
   in response to receiving the reply that the gateway device is capable of scanning the one or more first communication systems using the first scan list, but is not capable of scanning scan the one or more second communication systems: split the preconfigured combined scan list into the first scan list and the second scan list; and
   store, at a memory of the mobile device, the first scan list and the second scan list as separate lists.

* * * * *